(12) United States Patent
Funabiki et al.

(10) Patent No.: US 8,874,285 B2
(45) Date of Patent: Oct. 28, 2014

(54) STEERING ANGLE CONTROL SYSTEM FOR AIRCRAFT

(75) Inventors: Kohei Funabiki, Chofu (JP); Tomoko Shinkawa, Chofu (JP); Yasuhiro Yamaguchi, Nagoya (JP); Takuro Yamaji, Nagoya (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 224 days.

(21) Appl. No.: 13/378,473

(22) PCT Filed: Jun. 22, 2010

(86) PCT No.: PCT/JP2010/060501
§ 371 (c)(1),
(2), (4) Date: Mar. 5, 2012

(87) PCT Pub. No.: WO2010/150760
PCT Pub. Date: Dec. 29, 2010

(65) Prior Publication Data
US 2012/0158218 A1 Jun. 21, 2012

(30) Foreign Application Priority Data
Jun. 22, 2009 (JP) ................. 2009-147211

(51) Int. Cl.
*B64C 25/50* (2006.01)
*G05D 1/00* (2006.01)
(52) U.S. Cl.
CPC .............. *B64C 25/50* (2013.01); *G05D 1/0083* (2013.01)
USPC ................................................ 701/3; 244/50
(58) Field of Classification Search
CPC .................................................. G05D 1/0083
USPC ................................................ 701/3; 244/50
See application file for complete search history.

(56) References Cited

U.S. PATENT DOCUMENTS

| 2,430,869 | A | * | 11/1947 | Fulton, Jr. | ................. | 244/2 |
| 2,767,939 | A | * | 10/1956 | Taylor | ................. | 244/2 |

(Continued)

FOREIGN PATENT DOCUMENTS

| CN | 101254824 | | 9/2008 | | |
| FR | 2622846 A1 | * | 5/1989 | ............... | B60F 5/02 |

(Continued)

OTHER PUBLICATIONS

EPO machine translation of FR 2916720 (original FR document published Dec. 5, 2008).*
EPO machine translation of FR 2622846 (original FR document published May 12, 1989).*

(Continued)

*Primary Examiner* — Behrang Badii
*Assistant Examiner* — David Testardi
(74) *Attorney, Agent, or Firm* — Wenderoth, Lind & Ponack, L.L.P.

(57) ABSTRACT

An aircraft steering angle control system is provided that minimizes the amount of skidding of an airframe that is turning on a low-μ taxiway surface, such as an icy taxiway surface, and allows for directional control of the airframe by a steering command. The aircraft steering angle control system outputs an operation signal related to a steering angle as a control command signal for a nose steering wheel, and includes: a nose steering wheel envelope protection function including a reference steering angle setting unit that calculates a reference steering angle on the assumption that the airframe is not skidding; a skid detection unit that detects a skidding state of the airframe based on the reference steering angle; and a switch unit that selects a control command signal for the nose steering wheel in conjunction with the skid detection unit.

2 Claims, 4 Drawing Sheets

(56) References Cited

U.S. PATENT DOCUMENTS

| | | | |
|---|---|---|---|
| 2,953,323 A * | 9/1960 | Minch | 244/50 |
| 3,885,759 A * | 5/1975 | Lear | 244/50 |
| 4,221,350 A * | 9/1980 | Moser et al. | 244/50 |
| 5,050,817 A * | 9/1991 | Miller | 244/2 |
| 5,265,019 A | 11/1993 | Harara et al. | |
| 5,276,620 A | 1/1994 | Bottesch | |
| 5,549,173 A * | 8/1996 | Tomita | 180/417 |
| 6,449,542 B1 * | 9/2002 | Bottiger et al. | 701/41 |
| 6,449,543 B2 * | 9/2002 | Nishizaki et al. | 701/41 |
| 6,865,461 B2 * | 3/2005 | Neef et al. | 701/41 |
| 7,143,864 B2 * | 12/2006 | Mattson et al. | 180/446 |
| 7,357,357 B2 * | 4/2008 | Giazotto | 244/183 |
| 7,975,960 B2 * | 7/2011 | Cox et al. | 244/50 |
| 2004/0195914 A1 | 10/2004 | Beck et al. | |

FOREIGN PATENT DOCUMENTS

| | | | | |
|---|---|---|---|---|
| FR | 2916720 A1 * | 12/2008 | | B62D 6/00 |
| JP | 08-133189 | 5/1996 | | |
| JP | 8-133189 | 5/1996 | | |
| JP | 2580865 | 11/1996 | | |
| JP | 2570460 | 1/1997 | | |
| JP | 2580865 | 2/1997 | | |
| JP | 11334637 A * | 12/1999 | | B62D 6/00 |
| JP | 2008-213709 | 9/2008 | | |
| JP | 2009-67387 | 4/2009 | | |
| RU | 94025963 | 6/1996 | | |
| SU | 286510 | 11/1970 | | |
| SU | 1100179 | 6/1984 | | |
| WO | WO 2007031817 A1 * | 3/2007 | | B62D 6/00 |

OTHER PUBLICATIONS

Rajamani, Rajesh, "Chapter 2: Lateral Vehicle Dynamics" from Vehicle Dynamics and Control, ISBN 978-1-4614-1432-2, Springer, Copyright 2006, 2012, pp. 15-49.*

IAM web page, "Understeer & oversteer", Google indexing date: Oct. 1, 2002, 2 pages, downloaded from http://www.neleiam.co.uk/Driving_Information/Understeer_Oversteer/understeer_oversteer.html.*

Porsche Club, "Car control and driver training manual", revision 1, Internet archive date: Jul. 31, 2007, 28 pages, downloaded from http://www.porscheclub.com/pdf/drivertrainingmanualrscrev1.doc.pdf.*

Volvo owners club web page, "Safer Driving Tips—p. 8", Google indexing date: Jan. 16, 2004, 5 pages, downloaded from http://www.volvoclub.org.uk/safer-driving8.shtml.*

Decision on patent grant issued Apr. 18, 2013 in corresponding Russian Application No. 2011150930/11 (with English translation).

International Search Report issued Jul. 20, 2010 in corresponding International Application No. PCT/JP2010/060501.

Japanese Office Action dated Jan. 22, 2014 issued in corresponding Japanese Patent Application No. 2009-147211 (with partial English translation).

Office Action issued Sep. 27, 2013 in corresponding Canadian Application No. 2766041.

Office Action issued Apr. 23, 2014 in corresponding Chinese Application No. 201080027511.2, with English translation.

Japanese Decision to Grant a Patent issued Jul. 23, 2014 in corresponding Japanese Application No. 2009-147211.

* cited by examiner

STEERING ANGLE CONTROL SYSTEM FOR AIRCRAFT

BACKGROUND OF THE INVENTION

1. Field of the Invention

The present invention relates to an aircraft steering angle control system that turns an airframe that is taxiing to a desired direction using an operation signal related to a steering angle as a control command signal for a nose steering wheel, and particularly relates to an aircraft steering angle control system that minimizes the amount of skidding of the airframe that is turning on a low-μ taxiway surface such as an icy taxiway surface and allows for directional control of the airframe by a steering command.

2. Description of the Related Art

In an aircraft steering angle control system that controls a nose wheel using an electric signal, a steering command signal via a steering wheel, a pedal, or the like is used as a control command for a nose steering wheel, and an airframe is turned to a desired direction by changing the angle of the nose steering wheel.

FIG. 6 is an explanatory diagram showing a correlation between a steering command, the angle of a nose steering wheel, and a rate of turn of a conventional steering angle control system (see Japanese Unexamined Patent Application, Publication No. 8-133189, for example). Steering commands correspond directly to angles of the nose steering wheel, and as the pilot increases the steering command, the angle of the nose steering wheel also increases. Accordingly, the rate of turn of the airframe increases as well. However, if the aircraft skids while it is turning, the rate of turn decreases even though the command increases, so that the airframe can no longer be steered to the desired direction, and in the worst case, the airframe falls into a so-called out-of-control state (unmaneuverable state). For this reason, incidents during movement on an icy taxiway surface, such as deviation of the airframe from a taxiway or contact with an obstruction due to loss of directional control by a steering command, have occurred frequently.

SUMMARY OF THE INVENTION

The present invention has been made in view of problems of the conventional technology as described above, and it is an object thereof to provide an aircraft steering angle control system that minimizes the amount of skidding of an airframe that is turning on a low-μ taxiway surface such as an icy taxiway surface and allows for directional control of the airframe by a steering command.

In order to achieve the object, an aircraft steering angle control system according to the present invention is an aircraft steering angle control system that outputs an operation signal related to a steering angle as a control command signal for a nose steering wheel, the control command causing an airframe that is taxiing to turn to a desired direction, the system including:

a reference steering angle setting unit that calculates a reference steering angle on the assumption that the airframe is not skidding; a skid detection unit that determines a skidding state of the airframe based on the reference steering angle; and a switch unit that selects and outputs the control command signal in conjunction with the skid detection unit, wherein when the skidding state of the airframe is detected, a signal related to the reference steering angle is used and output as the control command signal for the nose steering wheel while the operation signal related to the steering angle is not used and output.

In the above-described aircraft steering angle control system, the system is configured so that detection of the skidding state of the airframe and output of an optimum control command for the nose steering wheel when skidding occurs are performed based on, instead of the (steering) angle of the nose steering wheel, information on the command of a steering apparatus, for example, a steering wheel operated by the pilot. That is to say, while the airframe turns normally, the operation signal related to the steering angle is directly output to the nose steering wheel as the control command signal, but once the skidding state of the airframe is detected, the operation signal related to the steering angle is not directly output to the nose steering wheel as the control command signal. The signal related to the reference steering angle (reference steering angle) is output to the nose steering wheel as the control command signal. That is to say, once the skidding state of the airframe is detected, the steering angle of the steering apparatus is controlled so as to be an almost constant value (=the reference steering angle) independent of the steering command operated by the pilot. Therefore, the present steering angle control system is provided with a so-called nose steering wheel envelope protection function, which, once the skidding state of the airframe is detected, inhibits an excessive steering angle that would contribute to the skid of the airframe from being transmitted to the nose steering wheel as a control command, and thus it is possible to automatically control the angle of the nose steering wheel. This minimizes the amount of skidding of the airframe that is turning on a low-μ taxiway surface such as an icy taxiway surface, and consequently allows for directional control of the airframe by a steering command.

In the aircraft steering angle control system according to the present invention, the reference steering angle is determined by $L*\omega/V$, where V represents a ground speed of the airframe, ω represents a yaw rate of the airframe, and L represents a distance between the center of gravity of the airframe and a nose wheel.

With the above-described aircraft steering angle control system, since the ground speed V and the yaw rate ω of the airframe can be easily acquired from a measuring instrument provided on the aircraft, the reference steering angle that is central to the above-described nose steering wheel envelope protection function can be easily determined. Therefore, it is possible to advantageously achieve the object of the present invention by making a small improvement to an existing steering angle control system.

The steering angle control system of the present invention has a configuration in which an aircraft steering angle control system that outputs an operation signal related to a steering angle as a control command signal for a nose steering wheel incorporates a nose steering wheel envelope protection, the nose steering wheel envelope protection including a reference steering angle setting unit that calculates a reference steering angle on the assumption that the airframe is not skidding, a skid detection unit that detects a skidding state of the airframe based on the reference steering angle, and a switch unit that selects a control command signal for a nose wheel in conjunction with the skid detection unit. Thus, it is possible to detect the skidding state of the airframe based on information on the steering angle of the steering apparatus operated by the pilot, inhibit an excessive steering angle that would contribute to the skid of the airframe from being transmitted to the nose steering wheel as a control command, and automatically control the angle of the nose steering wheel. Therefore, an aircraft provided with the present steering angle control system has stable directional control characteristics (turning characteristics) with respect to taxiing. Therefore, it is possible for the pilot to stably turn the airframe by a steering command regardless of the taxiway surface state and the experience of, and skill in taxiing. As a result, stable taxiing can be performed, and the workload of the pilot is significantly reduced. Moreover, due to the nose steering wheel envelope protection function of the present invention, the pilot rarely encounters an unmaneuverable state, and therefore, a decrease in the number of aircraft incidents such as deviation of the aircraft from a taxiway or contact with an obstruction due to loss of directional control, and a significant improvement in aircraft safety during taxiing can be expected.

DETAILED DESCRIPTION OF THE INVENTION

Figure 1:
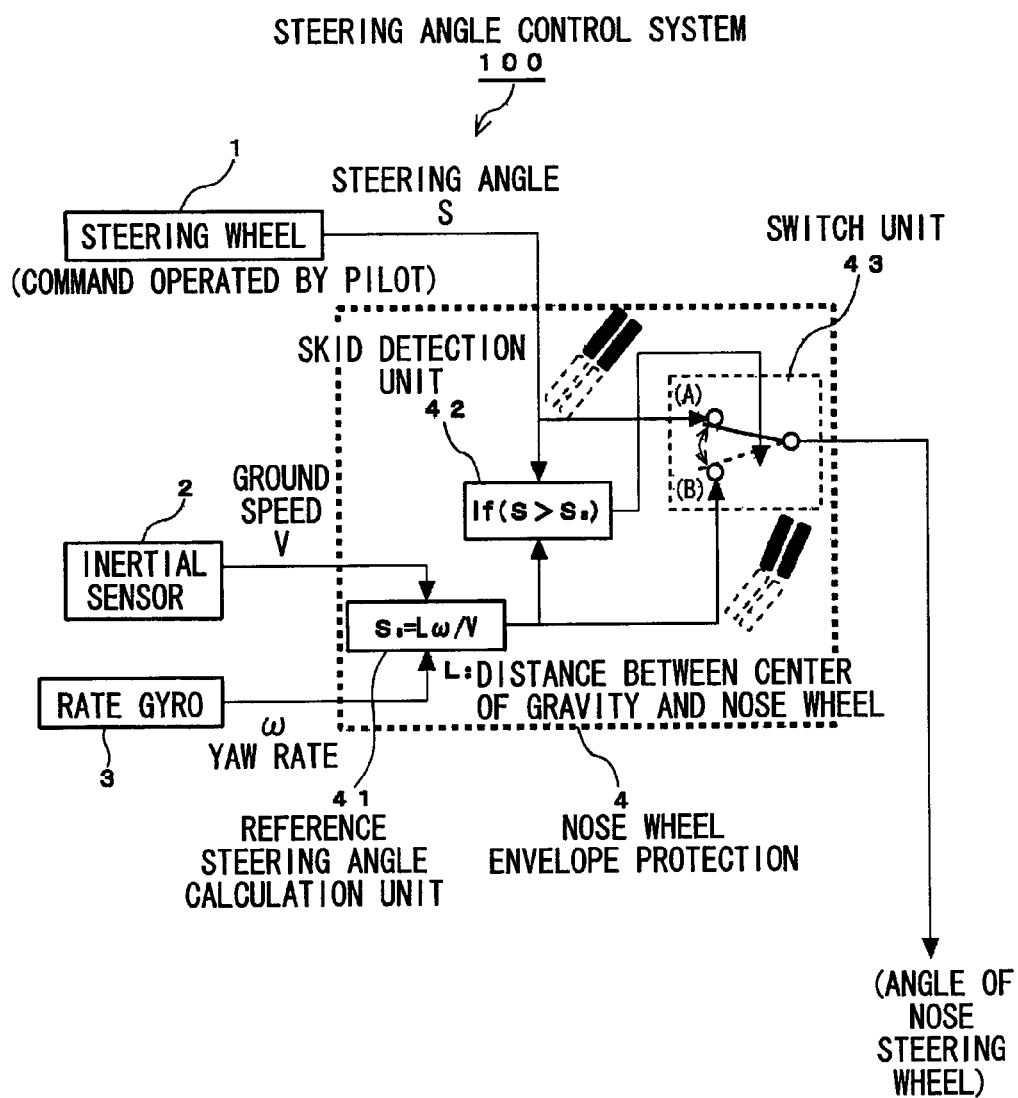
FIG. 1 is a diagram for explaining the configuration of a steering angle control system according to the present invention.

Hereinafter, the present invention will be described in greater detail by referring to an embodiment shown in the drawings. It should be noted that the present invention is not limited to this embodiment.

FIG. 1 is a diagram for explaining the configuration of a steering angle control system 100 according to the present invention.

This steering angle control system 100 includes a steering wheel 1 that outputs a control command signal (a steering angle S) for a nose wheel in accordance with a command operated by the pilot; an inertial sensor 2 that measures a ground speed V of an aircraft (airframe) that is moving; a rate gyro 3 that measures a yaw rate ω of the airframe; and a nose wheel envelope protection 4 that captures the ground speed V and the yaw rate ω, calculates a steering angle $S_S$ on the assumption that the airframe is not skidding, determines whether or not the airframe is skidding based on the steering angle $S_S$, and prevents an excessive steering angle S that would contribute to the skid of the airframe from being generated if it is determined that the airframe is skidding. It should be noted that the steering wheel 1 can be of any type, such as a handle type, a lever type, or a pedal type, as long as it outputs a linear electric signal in accordance with the command.

The nose wheel envelope protection 4 is configured of a reference steering angle calculation unit 41 that calculates the aforementioned steering angle $S_S$, a skid detection unit 42 that detects a skidding state of the airframe based on the aforementioned steering angle $S_S$ and steering angle S, and a switch unit 43 that selects a control command signal for the nose wheel (nose steering wheel) in conjunction with the skid detection unit 42.

Now, the operation of this steering angle control system 100 will be briefly described. A control command signal of the steering angle S that has been output by the pilot operating the steering wheel 1 is input to the skid detection unit 42 of the nose wheel envelope protection 4 and also input to the switch unit 43. In an initial state, a contact A of the switch unit 43 is effective, and thus the steering angle S is directly output as a control command signal for the nose wheel. Meanwhile, the other unit, that is, the skid detection unit 42, to which the control command signal of the steering angle S has been input, receives a steering angle $S_S$ (hereinafter referred to as the "reference steering angle $S_S$") calculated on the assumption that the airframe is not skidding from the reference steering angle setting unit 41, compares the sizes of the reference steering signal $S_S$ and the steering angle S, and switches the contact so that a contact B of the switch unit 43 becomes effective if the steering angle S is larger than the reference steering angle $S_S$ (if it is determined that the airframe is skidding). Thus, the control command signal of the excessive steering angle S from the pilot is blocked, and as the control command signal for turning the nose wheel (nose steering wheel), the reference steering angle $S_S$ calculated by the reference steering angle setting unit 41 is output via the contact B of the switch unit 43. It should be noted that, with regard to the reference steering angle $S_S$, a reference steering angle $S_S$ in accordance with the latest ground speed and yaw rate (V, ω) may be output, or a reference steering angle $S_S$ immediately before switching between the contacts may be latched and a signal of this angle output thereafter.

Moreover, the above-described reference steering angle $S_S$ that is calculated on the assumption that the airframe is not skidding can be obtained as follows using the ground speed V from the inertial sensor, the actual yaw rate ω from the rate gyro, and a distance L between the center of gravity of the airframe and the nose wheel:

$$S_S = L \times \omega / V$$

Figure 2:
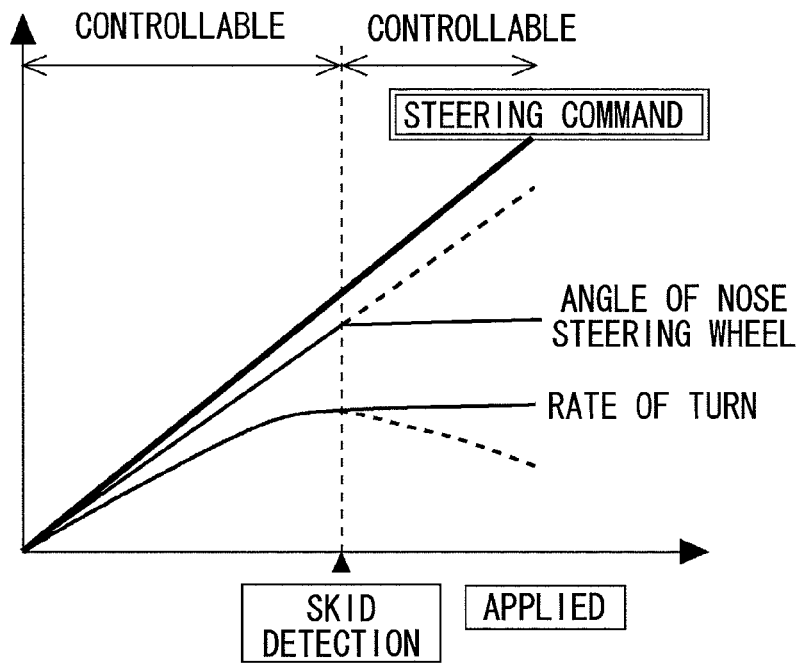
FIG. 2 is an explanatory diagram showing a correlation between a steering command, an angle of a nose steering wheel, and a rate of turn of the steering angle control system according to the present invention.

As previously described, FIG. 2 is an explanatory diagram showing a correlation between the steering command, the angle of the nose steering wheel, and the rate of turn of the steering angle control system 100. That is to say, while the airframe turns normally, the angle of the nose steering wheel increases with the steering command operated by the pilot. As a result, the rate of turn of the airframe also increases with the steering command operated by the pilot. Then, once the steering angle control system 100 detects the skidding state of the airframe, an output line to the nose wheel is switched so as to prevent an excessive steering angle S that would contribute to the skid of the airframe from being output as a control command signal for the nose wheel. As a result, the excessive steering angle S from the pilot is not output as the control command signal for the nose wheel, and instead, the reference steering angle $S_S$ is output as a new control command signal for the nose wheel. Therefore, once the steering angle control system 100 detects the skidding state of the airframe, the angle of the nose steering wheel is held at, or controlled so as to be a constant angle (=the reference steering angle $S_S$). Thus, the rate of turn of the airframe is held constant as well, and the amount of skidding of the airframe is minimized. Therefore, the pilot is freed from the out-of-control state in which the pilot cannot perform directional control of the airframe by a steering command and, at the same time, the workload of the pilot is advantageously reduced. It should be noted that the results of a verification test of the above-described steering angle control system 100 will be described later with reference to FIGS. 3 to 5.

Figure 3:
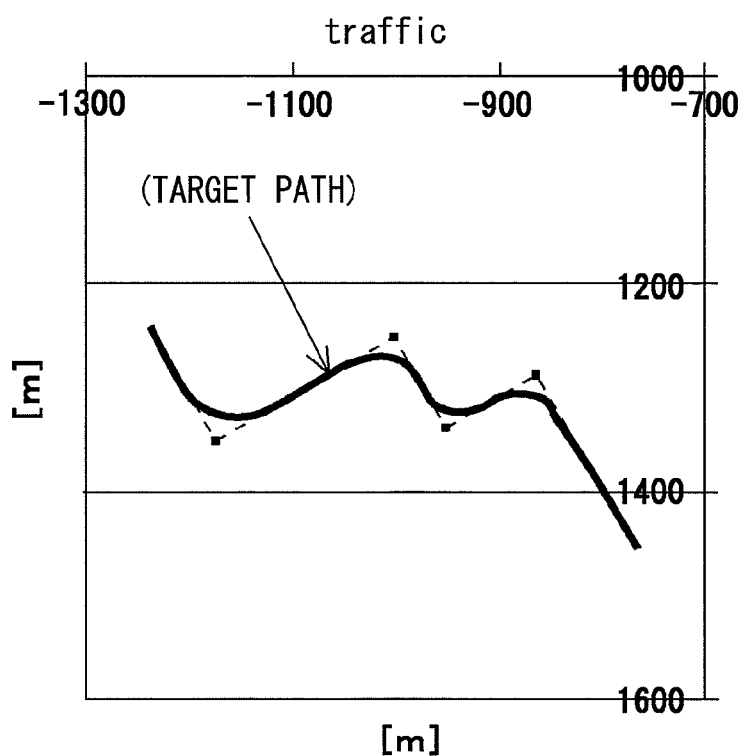
FIG. 3 is an explanatory diagram showing a target path in a verification test.

FIG. 3 is an explanatory diagram showing a target path in the verification test.

The verification test for confirming the effects of the present invention was conducted by determining the path error between an actual following path and the target path when an airframe moved under predetermined conditions with the path shown in FIG. 3 set as the target.

Figure 4:
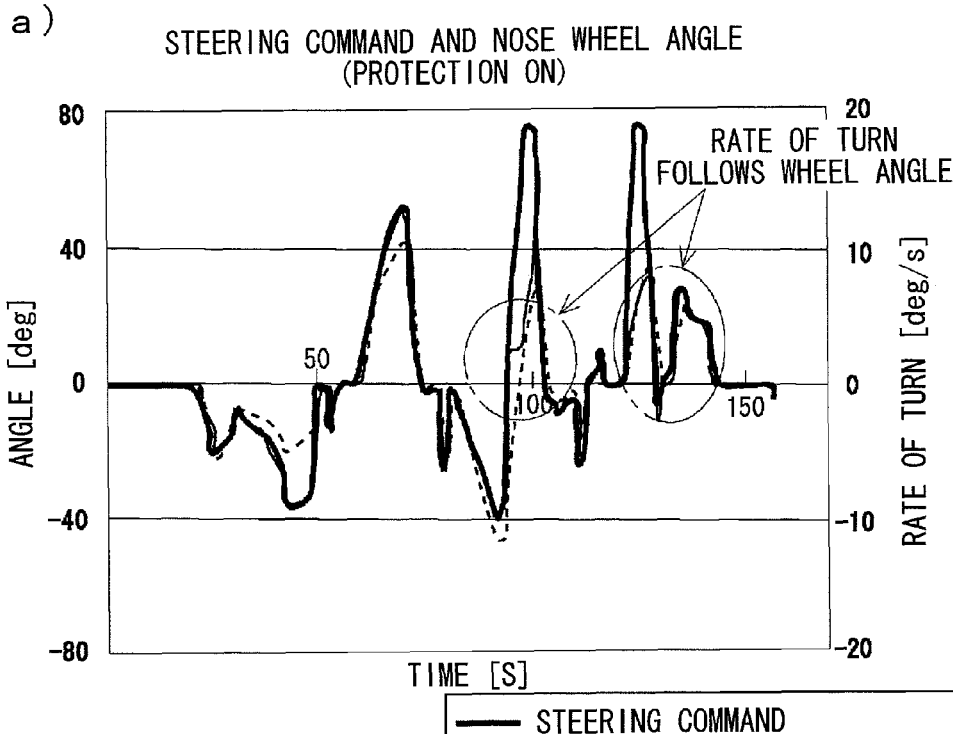
FIG. 4 shows explanatory diagrams indicating time-series data on a command (solid bold line), the angle of the nose steering wheel (solid line), and a rate of turn (dotted line) when an airframe moved with the path shown in FIG. 3 set as the target.
Figure 4:
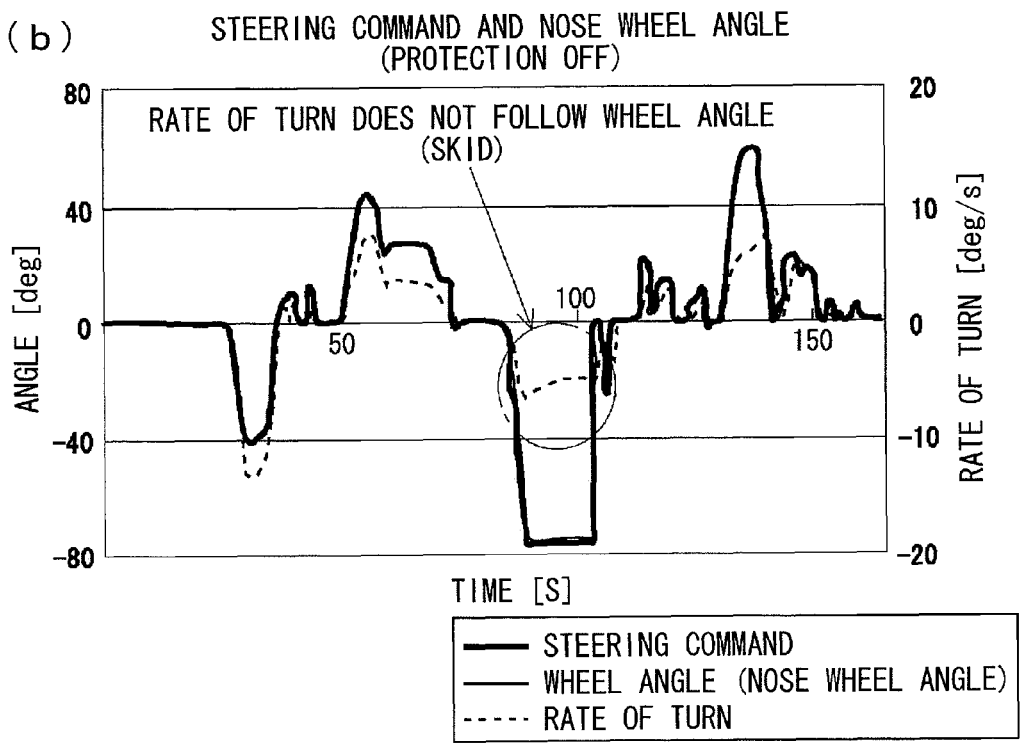

FIG. 4 shows explanatory diagrams indicating time-series data on the steering command (solid bold line), the angle of the nose steering wheel (solid line), and the rate of turn (dotted line) when the airframe moved with the path shown in FIG. 3 set as the target. It should be noted that FIG. 4(a) shows data on the steering command, angle of the nose steering wheel, and rate of turn in the case where the nose wheel envelope protection 4 according to the present invention was allowed to function (protection was on), and FIG. 4(b) shows data on the steering command, angle of the nose steering wheel, and rate of turn in the case where the envelope protection 4 according to the present invention was not allowed to function (protection was off).

In a normal state in which the airframe is not skidding, the rate of turn substantially follows the steering command. In other words, the three types of lines coincide.

However, as can be seen in FIG. 4(b), once the airframe begins to skid as a result of a large steering angle, the rate of turn no longer follows the steering command. In other words, the dotted line deviates from the other two types of lines.

On the other hand, as shown in FIG. 4(a), in the case where the nose wheel envelope protection according to the present invention was allowed to function, the actual wheel angle is restricted even at an increased steering command, so that the rate of turn follows the wheel angle within a range in which a skid does not occur. This indicates that the wheel angle follows and is controlled well with respect to the control command signal of the steering angle S from the pilot, and the airframe moves along the target path.

Figure 5:
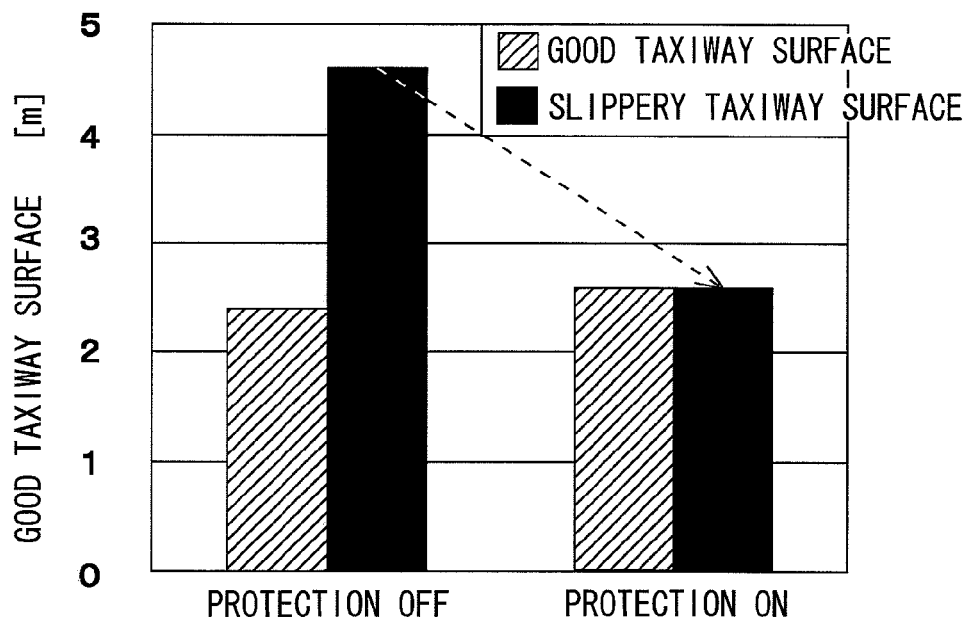
FIG. 5 is an explanatory diagram showing the path error between an actual following path and the target path.
Figure 6:
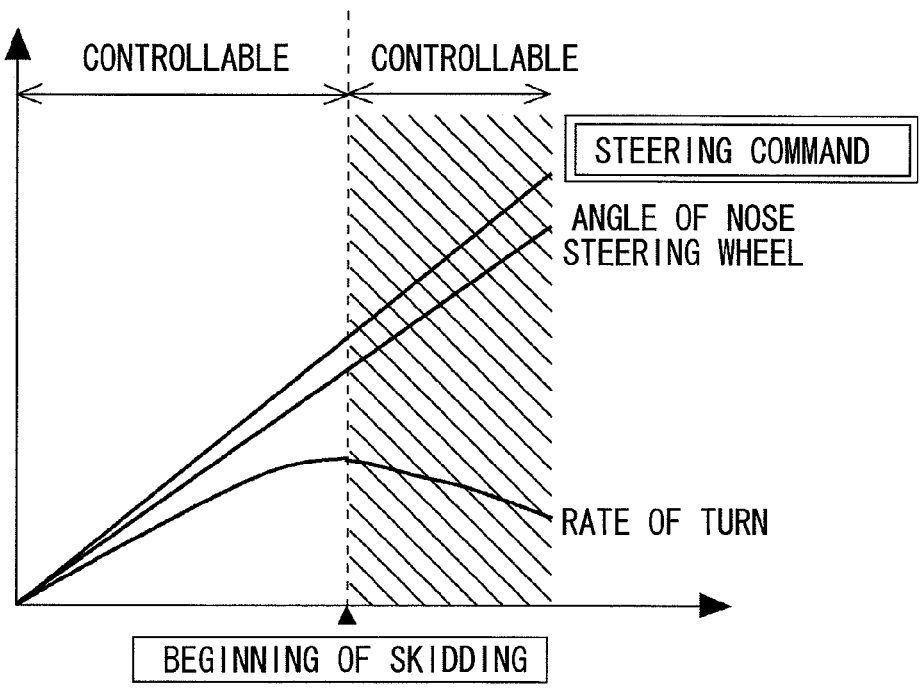
FIG. 6 is an explanatory diagram showing a correlation between the steering command, the angle of the nose steering wheel, and the rate of turn of a conventional steering angle control system.

FIG. 5 is an explanatory diagram showing the path error between the actual following path and the target path.

On an especially slippery taxiway surface, allowing the nose wheel envelope protection according to the present invention to function resulted in a preferable decrease in the (average) path error.

As described above, the steering angle control system 100 according to the present invention has a configuration in which an aircraft steering angle control system that outputs an operation signal related to the steering angle S as a control command signal for a nose steering wheel (nose wheel) incorporates the nose wheel envelope protection 4 configured of the reference steering angle setting unit 41 that calculates a reference steering angle $S_S$ on the assumption that the airframe is not skidding, the skid detection unit 42 that detects the skidding state of the airframe based on the reference steering angle $S_S$, and the switch unit 43 that selects the control command signal for the nose wheel in conjunction with the skid detection unit 42. This enables the pilot to stably turn the aircraft by a steering command regardless of the taxiway surface state and the experience of, and skill in taxiing. As a result, stable taxiing can be performed, and the workload of the pilot will be significantly reduced. Moreover, due to the wheel envelope protection 4 according to the present invention, the pilot rarely encounters the out-of-control state, and therefore, a decrease in the number of aircraft incidents such as deviation of the aircraft from a taxiway or contact with an obstruction due to loss of directional control, and a significant improvement in aircraft safety during taxiing can be expected.

The steering angle control system according to the present invention can be advantageously applied to an apparatus for preventing a nose steering wheel of aircraft from skidding.

The invention claimed is:

1. An aircraft steering angle control system that outputs an operation signal related to a steering angle as a control command signal for a nose steering wheel, the control command causing an airframe that is taxiing to turn to a desired direction, the system comprising:
a reference steering angle setting unit that calculates a reference steering angle on an assumption that the airframe is not skidding;
a skid detection unit that determines a skidding state of the airframe based on the reference steering angle, the skidding state indicating whether or not the airframe is skidding; and
a switch unit that selects and outputs the control command signal in conjunction with the skid detection unit,
wherein when the determined skidding state of the airframe indicates that the airframe is skidding, a signal related to the reference steering angle is output as the control command signal for the nose steering wheel and the operation signal related to the steering angle is not used and output, and
wherein the reference steering angle is determined by $L*\omega/V$, where V represents a ground speed of the airframe, $\omega$ represents a yaw rate of the airframe, and L represents a distance between a center of gravity of the airframe and the nose steering wheel.

2. An aircraft steering angle control method for outputting an operation signal related to a steering angle as a control command signal for a nose steering wheel, the control command causing an airframe that is taxiing to turn to a desired direction, the method comprising:
calculating, by a calculation unit, a reference steering angle on an assumption that the airframe is not skidding;
determining a skidding state of the airframe based on the reference steering angle, the skidding state indicating whether or not the airframe is skidding; and
selecting and outputting the control command signal in conjunction with an outcome of the determining of the skidding state of the airframe,
wherein when the determined skidding state of the airframe indicates that the airframe is skidding, a signal related to the reference steering angle is output as the control command signal for the nose steering wheel and the operation signal related to the steering angle is not used and output;
wherein when the determined skidding state of the airframe indicates that the airframe is not skidding, the operation signal related to the steering angle is used and output; and
wherein the reference steering angle is determined by $L*\omega/V$, where V represents a ground speed of the airframe, w represents a yaw rate of the airframe, and L represents a distance between a center of gravity of the airframe and the nose steering wheel.

\* \* \* \* \*